Patented May 1, 1934

1,956,811

UNITED STATES PATENT OFFICE 1,956,811

METHOD OF PREPARING LACTOSE

Paul Francis Sharp, Ithaca, N. Y., assignor to Cornell University, Ithaca, N. Y., a corporation of New York No Drawing. Application March 16, 1929, Serial No. 347,745

3 Claims. (Cl. 127—31)

Lactose, more commonly known as milk-sugar, exists in two forms, known respectively as alpha lactose and beta lactose, the former having two sub-species, the hydrous and the anhydrous. The dry lactose of commerce consists of the hydrous alpha form and is of comparatively low solubility at ordinary temperatures, whereas beta lactose is of higher solubility than the alpha form at ordinary temperatures. The beta form is not known to commerce because hitherto no process has been discovered for preparing it on a commercial scale except in admixture with a comparatively high proportion of the alpha form. Lactose having substantially the beta form only would have commercial advantages far in excess of the alpha form. It is much more readily soluble than the latter and, possibly, because of its higher solubility, has a sweeter taste. In fact, it is sufficiently sweet to be used in place of cane sugar, and for many uses it would be more desirable than cane sugar. Its greater solubility enables larger quantities thereof to be administered in solution in a given body of water to patients suffering from certain ailments for which lactose, especially in combination with certain milk preparations, is deemed an efficient remedy.

If alpha lactose is brought into solution, for instance, with water, a certain proportion of it will, within a comparatively short time, be converted into beta lactose, the proportion so converted depending upon the temperature of the solvent; the rapidity with which such conversion takes place depends also upon the temperature of the solvent. Beta lactose in solution will similarly, in part, be converted into alpha lactose. In either case the result at a given temperature will be the same, that is, the proportion of alpha lactose to beta lactose will be the same whether the original solute was alpha lactose or was beta lactose, and when the conversion has been completed the lactose solution is said to be in equilibrium.

It is known that lactose will crystallize out of water solution either in the alpha form or in the beta form, depending upon the temperature at which the solution is maintained during the crystallization stage. Other things being equal, alpha lactose will crystallize out at a lower temperature than will beta lactose; and the degree of temperature above which the latter, and below which the former, will crystallize out is known in the chemical literature of lactose as the "transition point". This point lies at approximately 93° C., but may vary under different conditions for instance under the condition hereinafter referred to, which I have discovered, namely the presence of a substantial amount of beta lactose crystals. However, if attempts have been made to secure, with the aid of this knowledge, a body of beta lactose crystals in commercial quantities without admixture of a substantial proportion of alpha lactose crystals they have heretofore been unsuccessful.

I have found that beta lactose crystals may be obtained in commercial quantities without substantial admixture of alpha lactose crystals by crystallization from a solution whose temperature is maintained above the transition point while the solution is being agitated and subsequent separation of the mother liquor from the crystals under conditions which will not permit the formation of substantial quantities of alpha crystals. The solution is initially in a condition of equilibrium, i. e. it contains such proportion of alpha and beta lactose as is normal for the temperature of the solution. As the crystals of beta lactose form and separate out of solution, this equilibrium is disturbed but it is immediately restored by the conversion of some of the alpha lactose into beta lactose, the latter then settling out in the form of beta lactose crystals. When the solution has been concentrated to such a degree that further concentration would cause a caking of the mass or render it difficult to separate the crystals from the mother liquor, the concentration is stopped. The vessel will then contain a magma consisting of a mass of beta lactose crystals and mother liquor, the latter consisting of water holding in solution alpha and beta lactose in equilibrium. If now the crystals are separated from the mother liquor, for instance, by means of a centrifugal dryer, under conditions which will not permit the formation of alpha lactose crystals, the crystalline mass will consist of beta lactose crystals only, or of beta lactose crystals containing only an insignificant proportion of alpha lactose crystals, depending upon the degree to which unfavorable conditions have been avoided. During the transfer and the drying operation the temperature need not be maintained above the "transition point" as heretofore understood by chemists, namely in the neighborhood of 93° C., if the process has been so carefully conducted that alpha crystals have not been permitted to form to such an extent and in such a manner as to seed the solution with alpha nuclei but, of course, this operation must not be conducted at so low a temperature and/or so slowly as to permit such crystals to form, in substantial quantities, i. e. the temperature should not be allowed to go below the "transition point" as this expression is used by me in my claims, namely the point below which alpha lactose crystals will form in any appreciable quantities under the particular operating conditions, for instance the amount of moisture present. The beta crystals may be washed with water to remove the last traces of mother liquor, and may then be dried by the application of heat. In the laboratory experiments made by me I have been able to wash the beta crystals with cold water without conversion of a substantial proportion of such crystals into alpha lactose. After a substantial amount of beta crystals has formed the temperature of the solvent may be decreased if no substantial seeding with alpha nuclei has taken place, and beta crystals will continue to form without formation of a substantial proportion of alpha crystals, a fact which seems incompatible with the present theory of beta lactose formation, but is probably due to the seeding action due to the presence of the large mass of beta crystals. I have found this to be the case when the temperature had been lowered to as far as 83° C. and even to as far as 78° C. Keeping the solution in a state of agitation during the concentration and crystallization period is an important feature of my process. This agitation may be produced by suitable stirring mechanism or, if the water boils during the concentration period, then by the ascending particles of steam or, if desirable, by a combination of both methods. It is particularly advisable to have the agitation of such a degree of violence that crystals will not be allowed to settle along the sides of the container as the level of the solution is being lowered by evaporation, it being, however, the primary object of the agitation to make sure that the solution and crystals are maintained at all times at a temperature above the transition point so as to insure against the formation of alpha crystals at any rate in substantial proportion or in such proportion as will suffice to act as seeding nuclei to encourage the formation of a substantial proportion of alpha crystals. A further advantage of the agitation is that it prevents a settling of the crystalline mass to such an extent as to be liable to cake, and thus occlude some of the mother liquor. A mere neglect of this precaution and/or an imperfect operation of my process, may result in the formation of substantial quantities of alpha lactose crystals without, however, in principle constituting a departure from my invention. I do not wish to be understood, however, as indicating that the mere temporary presence of alpha lactose crystals, which go into solution within a comparatively short time, will cause them to act as seeding nuclei, as I have found it possible to add a small proportion of alpha crystals during the crystallization stage without deleterious effect provided that they went into solution within a comparatively short time. A further advantage of the agitation is that it prevents too close an adherence between crystals and container, thus permitting a more rapid transfer of the magma to the centrifugal dryer with a resulting diminution of risk of lowering its temperature unduly during the transfer.

*Example 1*

2 kg. of alpha lactose and 1100 cc. of distilled water are placed in the inner member of a double boiler such as used in household cooking. Paraffin sufficient to rise two inches above the level of the water is placed in the outer member bottom of such boiler. Heat is applied to the outer boiler sufficient to maintain the paraffin at a temperature of about 140° C. The lactose forms a clear solution which, after concentration, becomes turbid with small crystals of beta lactose. The solution is concentrated until enough beta lactose crystals have been deposited to form, with the mother liquor, a thick mush. During the entire concentration stage the solution is kept agitated both by the steam bubbles and by the application of an electrically driven stirrer. About 300 cc. of glycerol, previously heated to a temperature of 125°–140° C., are added to dilute the mush so that it may readily be poured. The mush is then poured into a rapidly revolving centrifuge basket previously heated by pouring therethrough glycerol at a temperature of 140° C. After the mother liquor has been separated from the crystals the latter are washed while still in the basket with about two liters of glycerol at about 140° C. to get rid of the last traces of water, and such glycerol is removed by the use of about two liters of 95% alcohol. The crystals are then removed from the basket and spread on paper and dried at a temperature of about 50° C. The result will be a yield of almost 1000 grams of beta lactose absolutely free from all traces of the alpha form.

*Example 2*

Heat 1100 cc. of water and 2 kg. of alpha lactose to form a complete solution and boil down the solution until it weighs 2328 gr.; then add 100 gr. of glycerol having a temperature of 130° C. Pour the resulting mixture into a centrifuge and wash it there three times with aproximately equal amounts of glycerol having a temperature of 130° C., using approximately 500 gr. of glycerol in all for this purpose. Then wash the crystals three times with approximately equal amounts of 95% alcohol, using about 800 cc. of alcohol altogether for this purpose. Then dry the crystals for instance at a temperature of 50° C. The seeding test will show that no alpha lactose crystals are present.

*Example 3*

Into a steam jacketed boiler provided with a stirring mechanism place 25 pounds of water. To this add 50 pounds of alpha lactose. Then heat the mixture to boiling and agitate with the electric stirrer. When the resulting solution contains about 75% of total solids beta lactose begins to crystallize out. Continue boiling until a thick mush is obtained. At this point the mixture contains about 83% total solids by weight. Then draw the mixture from the kettle and dump it into a rapidly revolving centrifuge basket which throws out the mother liquor. Wash the crystals remaining in the centrifuge basket in a small amount of tap water while the centrifuge is in rapid motion. Allow the centrifuge to run for about five minutes after washing is stopped. Remove the lactose from the centrifuge and dry it in air. The yield is about 22–23 pounds of a product containing (as calcuated by moisture content) substantially 98–99% beta lactose crystals and from 2–1% of alpha lactose crystals, but containing probably a substantially higher percentage of beta lactose.

*Example 4*

Dissolve 2 kg. of lactose in 1000 cc. of water in an open vessel. Boil over a free flame which, because it heats intensely only one portion of the bottom of the container, causes a violent agitation, thus rendering it unnecessary to use a mechanical stirrer. When slightly less than two-thirds of the water have been evaporated, remove the flame and permit the temperature of the mixture to drop to 83° C. while stirring to maintain as nearly as possible an even temperature throughout. Then centrifuge and wash the mixture. Dry the resulting crystalline product in air at about 50° C. After drying the product consists of approximately 99% of beta lactose crystals and 1% of alpha lactose crystals.

I claim:

1. The process of producing beta lactose crystals free from substantial admixture with alpha lactose crystals, which comprises concentrating a solution of lactose in such a manner that beta lactose crystals will separate therefrom while maintaining such solution at a temperature above the transition point and simultaneously agitating the same to prevent the formation of a quantity of alpha crystals sufficient to constitute seeding nuclei, and then separating the mother liquor from the crystals under conditions whch will not permt the formation of a substantial porportion of alpha crystals.

2. The process of producing beta lactose crystals free from substantial admixture with alpha lactose crystals, which comprises concentrating a solution of lactose in such a manner that beta lactose crystals will separate therefrom while maintaining such solution at a temperature above the transition point and simultaneously agitating the same to prevent the formation of a quantity of alpha crystals sufficient to constitute seeding nuclei, and then separating the mother liquor from the crystals within a period of time which, under the conditions of temperature of the solution, will not permit the formation of a substantial proportion of alpha crystals.

3. The process of producing beta lactose crystals free from substantial admixture with alpha lactose crystals, which comprises concentrating a solution of lactose in such a manner that beta lactose crystals will separate therefrom while maintaining such solution at the temperature of its boiling point, so that the ascending bubbles of steam will agitate the same and thus prevent the formation of a quantity of alpha crystals sufficient to constitute seeding nuclei, and then separating the mother liquor from the crystals under conditions which will not permit the formation of a substantial proportion of alpha crystals.

PAUL FRANCIS SHARP.